(12) United States Patent
Horng

(10) Patent No.: US 6,290,471 B1
(45) Date of Patent: Sep. 18, 2001

(54) PIVOTAL STRUCTURE FOR AN IMPELLER OF A MINIATURE HEAT DISSIPATING FAN

(75) Inventor: Alex Horng, Kaohsiung (TW)

(73) Assignee: Sunonwealth Electric Machine Industry Co., Ltd., Kaohsiung (TW)

(*) Notice: Subject to any disclaimer, the term of this patent is extended or adjusted under 35 U.S.C. 154(b) by 0 days.

(21) Appl. No.: 09/506,697

(22) Filed: Feb. 18, 2000

(51) Int. Cl.⁷ .................................... F04B 17/03
(52) U.S. Cl. .................. 417/354; 417/423.12; 417/424.1
(58) Field of Search .................... 417/353, 354, 417/423.12, 421.1

(56) References Cited

U.S. PATENT DOCUMENTS 2,976,808 * 3/1961 Whitehurst ........................ 417/353
3,354,833 * 11/1967 Laing ............................... 417/353
3,378,192 * 4/1968 Friese .............................. 417/353
4,955,791 * 9/1990 Wrobel .......................... 417/423.12
6,050,785 * 4/2000 Horng ............................. 417/354
6,183,221 * 2/2001 Hsieh ............................ 117/423.12

FOREIGN PATENT DOCUMENTS 355037   3/1999 (TW) .

* cited by examiner

Primary Examiner—Michael Koczo
(74) Attorney, Agent, or Firm—Bacon & Thomas, PLLC

(57) ABSTRACT

A miniature heat dissipating fan includes a housing and an impeller. A circuit board and a stator bobbin, a balance plate, and an axle support. The axle support has an axle or a bearing member mounted thereto. The impeller has a bearing member or an axle and arranged in a manner that the axle and the bearing member support each other. The impeller further includes a ring magnet wherein the ring magnet and the balance plate attract each other.

7 Claims, 4 Drawing Sheets

PIVOTAL STRUCTURE FOR AN IMPELLER OF A MINIATURE HEAT DISSIPATING FAN

BACKGROUND OF THE INVENTION

1. Field of the Invention

The present invention relates to a pivotal structure for an impeller shaft of a miniature heat dissipating fan

2. Description of the Related Art

Taiwan Utility Model Publication No. 355037, issued on Mar. 21, 1999 and entitled "IMPROVED BEARING LUBRICATION FOR A BRUSHLESS D.C. FAN", discloses an oil-pregnant bearing with a bore for receiving an axle, wherein a reservoir is defined in a middle portion of the bearing bore for receiving lubrication oil, and the pivotal seat of the fan housing includes a number of grooves for containing lubrication oil of the lubrication oil supply system.

It is, nevertheless, found that the bearing and the axle have a considerable contact surface area for rotation and thus have a larger frictional surface. Thus, noise tends to occur after a long-time use. In addition, the manufacture of the above-mentioned structure is troublesome and the cost therefor is high.

SUMMARY OF THE INVENTION

It is a primary object of the present invention to provide a pivotal structure for an impeller of a miniature heat dissipating fan in which the axle and the bearing member for supporting the axle have minimized contact surface area therebetween, thereby reducing the rotational noise and increasing the life for use.

It is a secondary object of the present invention to provide a pivotal structure for an impeller of a miniature heat dissipating fan in which the impeller can be easily assembled and the manufacture cost is reduced.

In accordance with the present invention, the axle and the bearing member for the axle have a minimized point contact therebetween. In addition, a balance plate is mounted below the ring magnet of the rotor. The balance plate and the ring magnet are positioned in a balanced manner and attract each other to thereby guarantee stable rotation of the impeller and minimized frictional contact between the axle and the bearing member.

Other objects, specific advantages, and novel features of the invention will become more apparent from the following detailed description and preferable embodiments when taken in conjunction with the accompanying drawings.

DETAILED DESCRIPTION OF THE PREFERRED EMBODIMENTS

Figure 1:
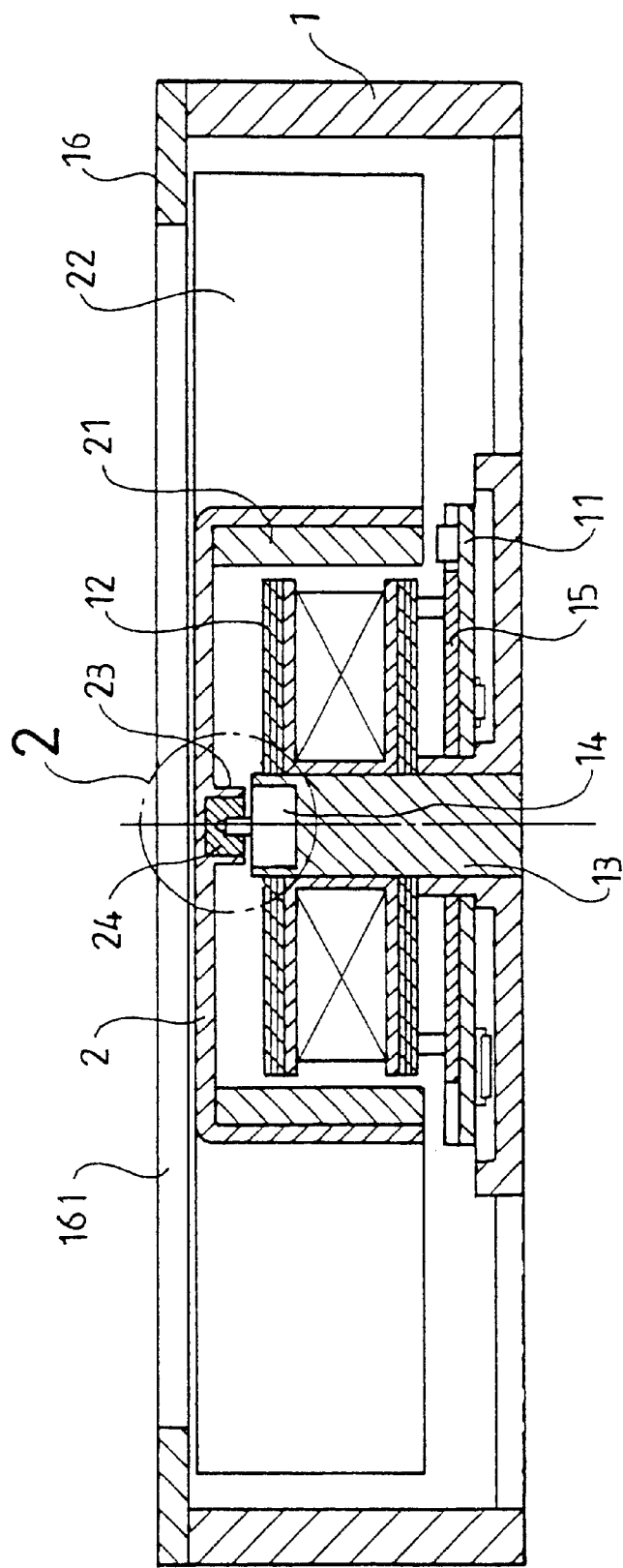
FIG. 1 is a sectional view of a first embodiment of a miniature heat dissipating fan in accordance with the present invention.
Figure 2:
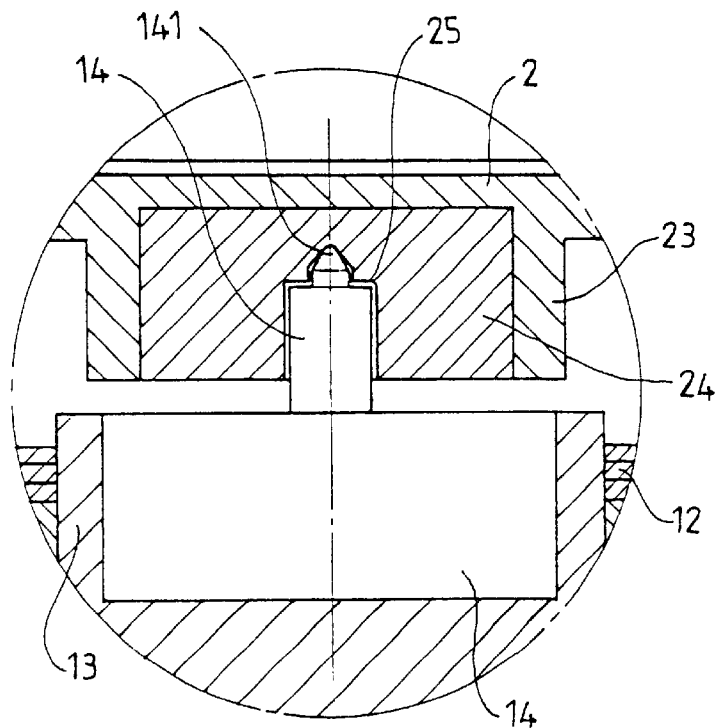
FIG. 2 is an enlarged view of a circle in FIG. 1.

Referring to FIGS. 1 and 2, a first embodiment of a miniature heat dissipating fan in accordance with the present invention generally includes a housing 1 and an impeller 2. The housing 1 includes an axle support 13 around which a circuit board 11 and a stator bobbin 12 are mounted. An axle 14 is mounted in the axle support 13 for rotational connection with the impeller 2. In order to provide a smaller friction between the axle 14 and the impeller 2, the axle 14 includes a supporting section 141 of a reduced diameter. The supporting section 141 is conic for supporting a bearing member 24 in the impeller 2, thereby forming a smaller friction area.

The housing 1 further includes a balance plate 15 mounted therein and made of magnetically permissive material. As illustrated in FIG. 1, the balance plate 15 is located on top of the circuit board 11, and, if desired, the balance plate 15 may be integrally formed with the circuit board 11. A diameter of the balance plate 15 is substantially equal to that of the ring magnet 21 of the impeller 2 above the balance plate 15 such that the ring magnet 21 and the balance plate 15 attract each other yet not contacting with each other. A lid 16 is mounted on top of the housing 1 and includes a vent 161 allowing air to pass therethrough. The vent 161 has a diameter smaller than that of the maximal diameter of the impeller 2, thereby preventing the impeller 2 from being removed out of the vent.

The ring magnet 21 of the impeller 2 interact with the stator bobbin 12 for induction purpose. The impeller 2 further includes blades 22 for driving air. A central area of the impeller 2 includes a bearing seat 23 with the aforementioned bearing member 24 therein. The bearing member 24 may be a bearing or made of abrasive-resistant material. As illustrated in FIG. 2, the bearing member 24 includes a cavity 25 into which the axle 14 extends, wherein the supporting section 141 of the axle 14 supports a portion of a peripheral wall defining the cavity 25, thereby providing minimized friction area between the axle 14 and the bearing member 24.

Figure 3:
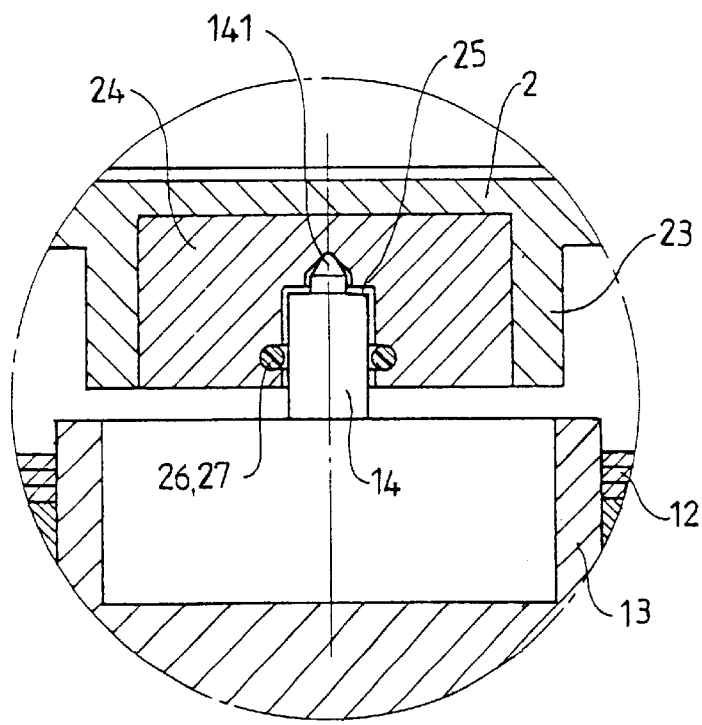
FIG. 3 is a view similar to FIG. 2, illustrating a second embodiment in accordance with the present invention.

FIG. 3 illustrates a second embodiment in accordance with the present invention, wherein the peripheral wall defining the cavity 25 includes an annular groove 26 for receiving a ring 27 made of rubber or the like. The ring 27 partially protrudes above the inner peripheral surface of the cavity 25 and has an inner diameter slightly greater than the diameter of the axle 14. Thus, the impeller 2 is allowed to have a relatively small declined angle to the axle 14 such that the ring magnet 21 of the impeller 2 is prevented from contacting with the stator bobbin 12. The ring 27 and the axle 14 are not in frictional contact when the impeller 2 rotates stably.

Figure 4:
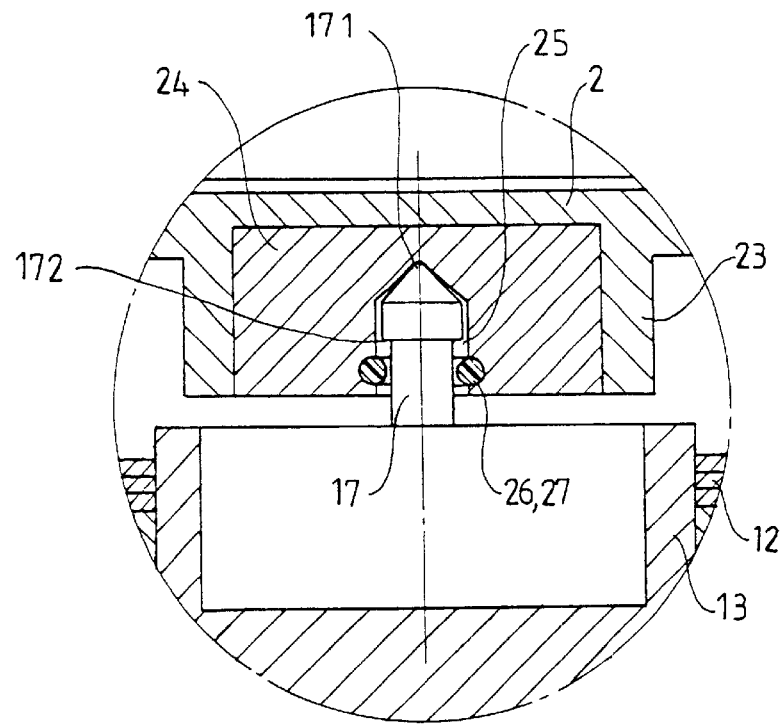
FIG. 4 is a view similar to FIG. 2, illustrating a third embodiment in accordance with the present invention.

FIG. 4 illustrates a third embodiment in accordance with the present invention, wherein the peripheral wall defining the cavity 25 includes an annular groove 26 for receiving a ring 27 made of rubber or the like. The ring 27 partially protrudes above the inner peripheral surface of the cavity 25 and has an inner diameter slightly greater than the diameter of the axle (now designated by 17). Thus, the impeller 2 is allowed to have a relatively small declined angle to the axle 17 such that the ring magnet 21 of the impeller 2 is prevented from contacting with the stator bobbin 12. The ring 27 and the axle 17 are not in frictional contact when the impeller 2 rotates stably. In addition, the axle 17 includes an enlarged diameter section to form an annular stop flange 172. Further, the axle 17 includes a conic distal end that tapers from the enlarged diameter section, thereby forming a supporting section 171 to support the bearing member 25. A friction area between the conic support section 171 and the bearing member 24 is minimized. The annular stop flange 172 may assist to prevent the impeller 2 from being removed out of the housing.

Figure 5:
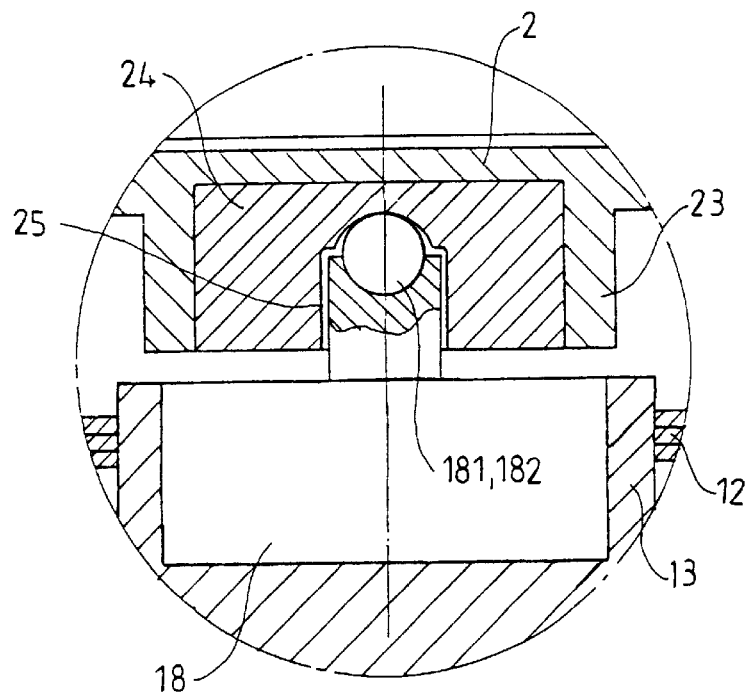
FIG. 5 is a view similar to FIG. 2, illustrating a fourth embodiment in accordance with the present invention.

FIG. 5 illustrates a fourth embodiment in accordance with the present invention, wherein the axle support 13 includes an axle 18 mounted thereto. The axle 18 includes a recess 181 in an upper end thereof for receiving a portion of a ball 182 made of abrasive-resistant material. The ball 182 provides a rotational support between the axle 18 and the bearing member 24. The bearing member 24 mounted in the bearing seat 23 is also made of abrasive-resistant material and includes a cavity 25 into which the axle 18 extends and which allows the bearing member 24 to be supported by the ball 182, thereby providing minimized friction area.

Figure 6:
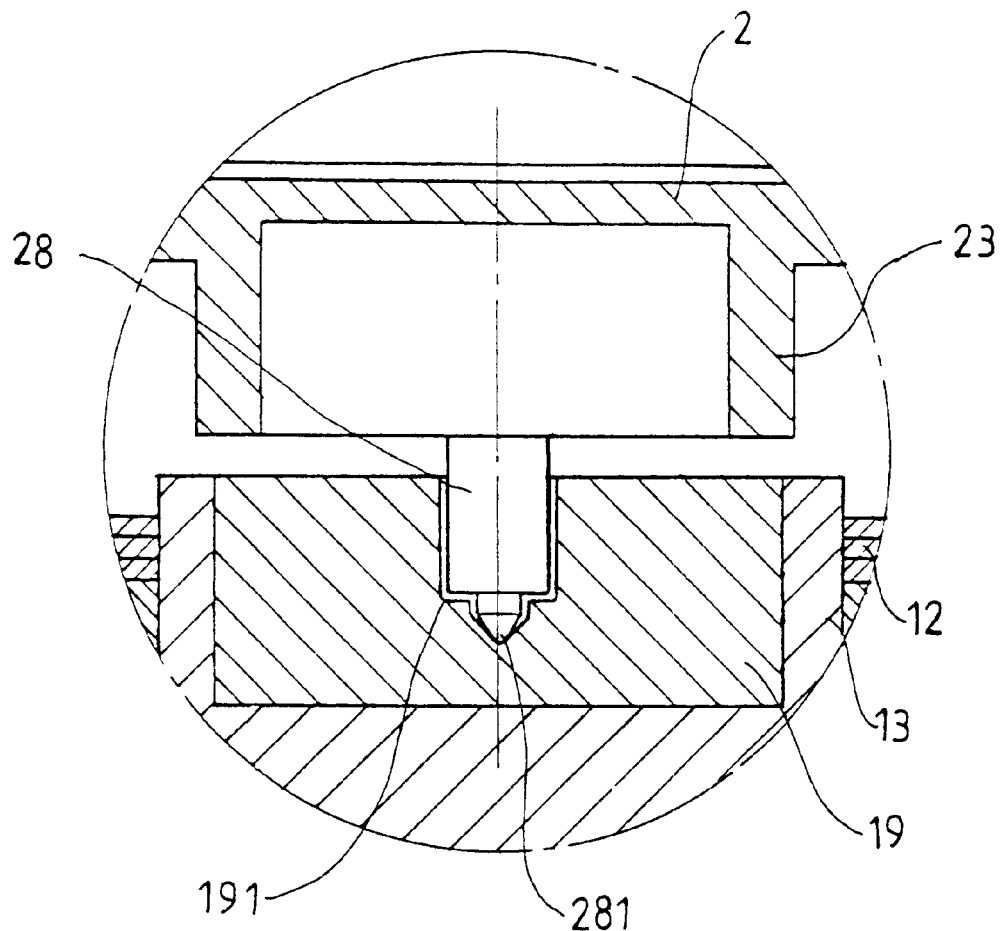
FIG. 6 is a view similar to FIG. 2, illustrating a fifth embodiment in accordance with the present invention.

FIG. 6 illustrates a fifth embodiment in accordance with the present invention, wherein the axle support 13 includes a bearing member 19 that is a bearing or made of abrasive-resistant material. The bearing member 19 includes a cavity 191 into which the shaft 28 of the impeller 2 extends. The cavity 191 is configured to support a supporting section 281 of the shaft 28, thereby providing minimized friction area Referring to FIG. 1, the axle and the bearing member have minimized friction area therebetween when the impeller 2 rotates relatively against the housing 1. The impeller is almost supported by a point contact during its rotational movements. In addition, the housing 1 includes a magnetically permissive balance plate 15 such that the ring magnet 21 of the impeller 2 and the balance plate 15 attract each other, thereby assuring reliable balanced stable rotation of the impeller 2. Thus, minimized friction is achieved when the impeller 2 rotates. Furthermore, during transport, the impeller 2 is prevented from being removed out of the lid 16 after the impeller 2 is engaged to the housing 1.

According to the above description, it is appreciated that minimized friction is achieved during rotation of the impeller to increase the life of the heat dissipating fan and to reduce the rotational noise.

Although the invention has been explained in relation to its preferred embodiment as mentioned above, it is to be understood that many other possible modifications and variations can be made without departing from the spirit and scope of the invention. It is, therefore, contemplated that the appended claims will cover such modifications and variations that fall within the true scope of the invention.

What is claimed is:

1. A miniature heat dissipating fan comprising:
 a housing including a circuit board and a stator bobbin mounted therein, an axle support being mounted in the housing and including an axle securely mounted thereto, the axle including an end forming a conic supporting section, a balance plate made of magnetically permissive material being mounted in the housing; and
 an impeller with blades for driving air, the impeller including a bearing seat in a central portion thereof, a bearing member being securely mounted in the bearing seat, the bearing member being supported by the conic supporting section of the axle, the impeller further including a ring magnet for interacting with the stator bobbin for induction purpose, the ring magnet and the balance plate attracting each other.

2. The miniature heat dissipating fan as claimed in claim 1, wherein the bearing member is made of abrasive-resistant material.

3. The miniature heat dissipating fan as claimed in claim 1, wherein the bearing member is a bearing.

4. The miniature heat dissipating fan as claimed in claim 1, wherein the bearing member includes a cavity into which the supporting section of the axle extends and allowing the supporting section of the axle to support the bearing member.

5. The miniature heat dissipating fan as claimed in claim 1, wherein the bearing member includes a cavity defined by a peripheral wall, the peripheral wall including an annular groove for receiving a ring, the ring partially protruding above the inner peripheral surface of the cavity and including an inner diameter greater that a diameter of the axle, thereby allowing the axle to extend therethrough.

6. The miniature heat dissipating fan as claimed in claim 1, wherein the bearing member includes a cavity defined by a peripheral wall, the peripheral wall including an annular groove for receiving a ring, the ring partially protruding above the inner peripheral surface of the cavity, the axle having a reduced section that extends through the ring, the axle further including a distal end having an enlarged section with a diameter greater than that of the reduced section, the supporting section being extended from the enlarged section.

7. The miniature heat dissipating fan as claimed in claim 1, wherein the housing further comprises a lid mounted on top thereof, the lid including a vent through which air is passable, the vent having a diameter smaller than a maximal diameter of the impeller.

\* \* \* \* \*